United States Patent Office.

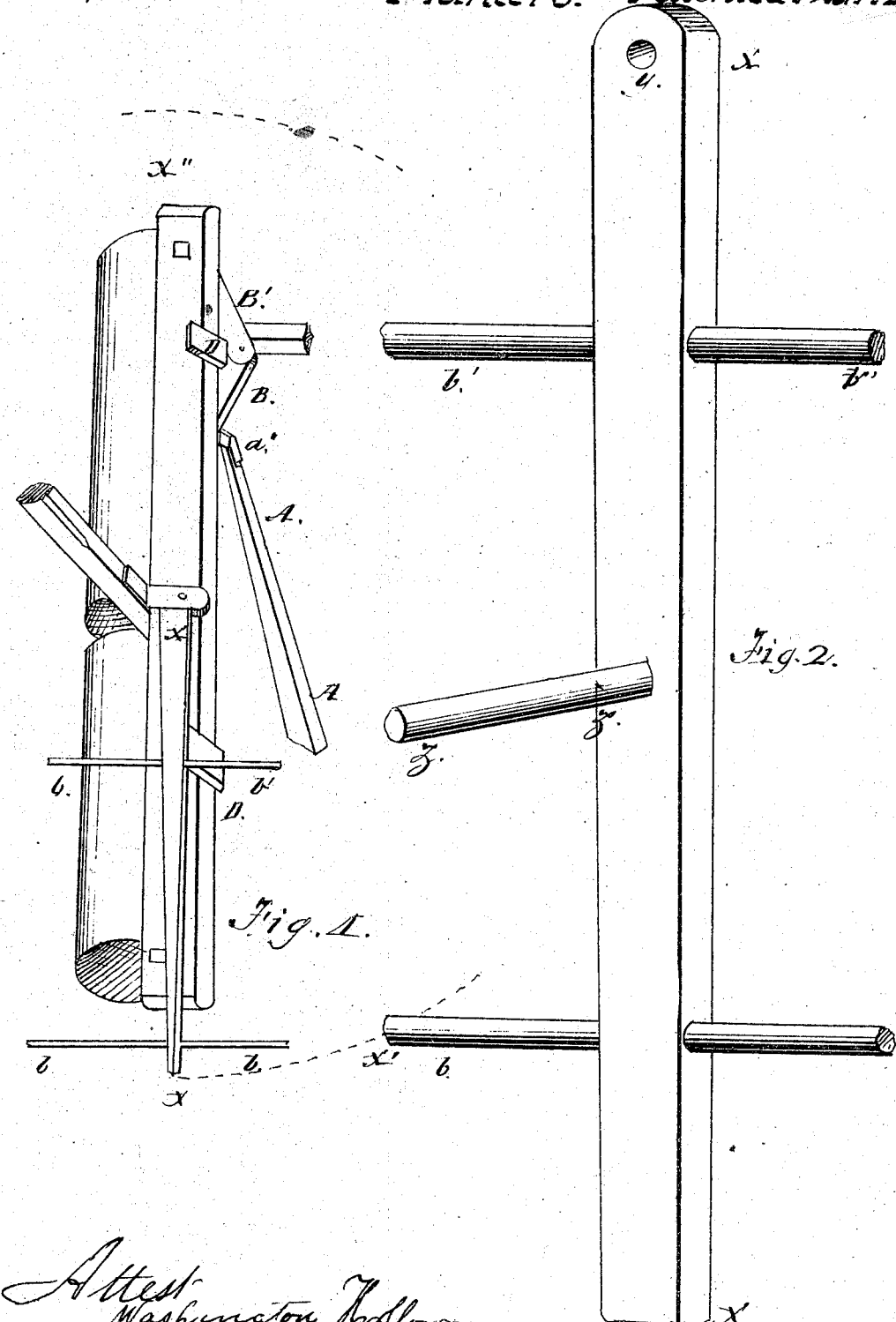

ELIJAH C. BROWN, OF CRAWFORDSVILLE, INDIANA.

Letters Patent No. 75,851, dated March 24, 1868.

IMPROVEMENT IN GUIDES FOR CORN AND SEED-PLANTERS.

The Schedule referred to in these Letters Patent and making part of the same.

TO ALL WHOM IT MAY CONCERN:

Be it known that I, ELIJAH C. BROWN, of the town of Crawfordsville, in the county of Montgomery, and in the State of Indiana, have invented an Improved Guide-Staff for Corn and Seed-Planters; and I do hereby declare that the following is a full, clear, and exact description thereof, reference being had to accompanying drawings, and letters and figures of reference marked thereon.

The nature of the invention consists in the use of an index and guide-staff in combination with a seed or corn-planter, by means of which the corn or seed may be planted in uniform rows both ways; said guide-staff and index to be made of wood or any other suitable materials.

To enable others skilled in the art to make and use my said invention, I proceed to describe it more fully, as follows:

The device consists of a horizontal bar, represented by X X of Figure 1 and Figure 2 of the accompanying drawings, in which are fixed two upright staffs, represented respectively by V V and V' V', as represented by figs. 1 and 2 of the accompanying drawings. Said device is also provided with a rest-bar, represented by Z Z, of fig. 2 of the accompanying drawings. At one end of the bar X is a hole, Y, through which it is intended to pass a bolt, around which the bar X will be free to move in a vertical plane.

To use said guide and index, it is attached to the tongue of the drill or seed-planter, as represented in fig. 1, aforesaid; the bar Z resting on the framework of the machine, so as not to let the staffs V and V' quite touch the ground. Indeed it must be so high, that it will not break against ordinary obstructions.

These two staffs, V and V', are so arranged that they will stand apart the same distance as that which supervenes between two rows of the vegetable to be planted, and for that purpose are made adjustable by means of a row of holes made to fit the outer guide-staff V. The bar is set on the tongue in such a way that the distance from the drill or planter-tooth will be the same as between two rows of the vegetable to be planted.

When the first row has been run off, the drill or planter is just in such a position that the outer staff V will be over the furrow, then by driving the drill or planter along in such a way that the staff V aforesaid will always be in the first furrow, two parallel furrows will be produced. When the driver has passed through the whole breadth of the field, and desires to turn round and go back, he can turn the staff over in the direction, as at the dotted line X' X'', and by pursuing the same course that he did with the first furrow, will have three parallel furrows, and so can proceed until the ground is all laid off one way. Then, to plant the seed, he has the guide the same as before, and each time, as the staff passes one of the cross-furrows, he causes the machine to drop the seed, which, on account of the adaptation aforesaid, will always be in the furrow behind that in which the staff stands. The staff may be turned from side to side, as necessity requires, in going in different directions.

By this means it is claimed that corn and other seed may be planted in uniformly even and equidistant rows.

What I claim, and desire to secure by Letters Patent, is—

The index and guide-staff, hereinbefore described, when the same is constructed in manner and form in its said several parts, and used for the purpose and in the way substantially as set forth.

In testimony that I claim the foregoing specification, I have hereunto set my hand, this   day of   , 186

ELIJAH C. BROWN

Witnesses:
WASHINGTON HOLLOWAY,
ABRAHAM HERR.